US 9,256,779 B2

(12) United States Patent
Obata

(10) Patent No.: US 9,256,779 B2
(45) Date of Patent: Feb. 9, 2016

(54) GESTURE RECOGNITION APPARATUS, GESTURE RECOGNITION METHOD, AND RECORDING MEDIUM

(71) Applicant: Alpine Electronics, Inc., Tokyo (JP)

(72) Inventor: Kijuro Obata, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 204 days.

(21) Appl. No.: 14/031,865

(22) Filed: Sep. 19, 2013

(65) Prior Publication Data

US 2014/0153774 A1 Jun. 5, 2014

(30) Foreign Application Priority Data

Dec. 4, 2012 (JP) ................. 2012-265377

(51) Int. Cl.
*G06K 9/00* (2006.01)

(52) U.S. Cl.
CPC ........ *G06K 9/00355* (2013.01); *G06K 9/00832* (2013.01)

(58) Field of Classification Search
None
See application file for complete search history.

(56) References Cited

U.S. PATENT DOCUMENTS

| | | | |
|---|---|---|---|
| 5,594,469 A | 1/1997 | Freeman et al. | |
| 6,154,559 A * | 11/2000 | Beardsley | A61B 3/113 340/576 |
| 6,498,970 B2 * | 12/2002 | Colmenarez | B60R 25/2045 382/116 |
| 6,677,969 B1 | 1/2004 | Hongo | |
| 6,703,999 B1 * | 3/2004 | Iwanami | B60K 35/00 345/156 |
| 6,766,036 B1 * | 7/2004 | Pryor | A63F 13/06 348/169 |
| 7,289,645 B2 * | 10/2007 | Yamamoto | B60K 37/06 382/104 |
| 7,295,904 B2 * | 11/2007 | Kanevsky | B60K 35/00 345/173 |
| 7,437,488 B2 | 10/2008 | Ito et al. | |
| 8,270,669 B2 * | 9/2012 | Aichi | G06F 3/0425 382/103 |
| 8,319,832 B2 * | 11/2012 | Nagata | G06F 3/03547 345/175 |
| 8,378,970 B2 * | 2/2013 | Nishida | G06F 3/017 345/158 |
| 8,421,642 B1 * | 4/2013 | McIntosh et al. | G06F 3/017 340/539.1 |
| 2002/0041260 A1 * | 4/2002 | Grassmann | B60K 35/00 345/7 |
| 2002/0126876 A1 * | 9/2002 | Paul | G06F 3/017 382/104 |
| 2002/0181773 A1 * | 12/2002 | Higaki | G06K 9/00335 382/190 |
| 2005/0025345 A1 * | 2/2005 | Ohta | B60H 1/0065 382/116 |
| 2005/0063564 A1 * | 3/2005 | Yamamoto | B60R 25/2045 382/104 |
| 2005/0134117 A1 * | 6/2005 | Ito | B60R 16/0373 307/10.1 |
| 2005/0238202 A1 * | 10/2005 | Sato | G06K 9/00832 382/104 |

(Continued)

FOREIGN PATENT DOCUMENTS

| | | |
|---|---|---|
| JP | 2000-163196 | 6/2000 |
| JP | 2007-121576 | 5/2007 |
| JP | 4311190 | 5/2009 |

*Primary Examiner* — Tsung-Yin Tsai
(74) *Attorney, Agent, or Firm* — Brinks Gilson & Lione

(57) ABSTRACT

A gesture recognition apparatus for recognizing a gesture of a predetermined operating body includes a storage unit, having stored therein, correspondence relationships between a plurality of coordinate ranges in relation to the operating body and to a plurality of operation target apparatuses, each of the plurality of coordinate ranges further corresponding to each operation target apparatus of the plurality of operation target apparatuses. An image capturing unit captures one or more images of the operating body, a coordinate detecting detects coordinates of the operating body based on the one or more captured images, and an operation target apparatus specifying unit selects an operation target apparatus corresponding to the detected coordinates of the operating body and the stored correspondence relationships. A gesture recognition processing unit recognizes a gesture associated with the operating body based on one or more captured images and corresponding to the selected operation target apparatus.

18 Claims, 5 Drawing Sheets

(56) References Cited

U.S. PATENT DOCUMENTS

| | | | | |
|---|---|---|---|---|
| 2009/0273563 | A1* | 11/2009 | Pryor | B60K 35/00 345/157 |
| 2010/0265600 | A1* | 10/2010 | Okuda | B60R 1/025 359/843 |
| 2011/0160933 | A1* | 6/2011 | Suzaki | B60K 35/00 701/1 |
| 2013/0076615 | A1* | 3/2013 | Iao | G06F 3/017 345/156 |
| 2014/0159961 | A1* | 6/2014 | Ware | G01S 5/06 342/385 |

* cited by examiner

| OPERATION TARGET APPARATUS | FUNCTION | POSITION COORDINATE RANGE |
|---|---|---|
| IN-VEHICLE APPARATUS | SOUND VOLUME CONTROL | X1, Y1 TO Xa, Ya |
| IN-VEHICLE APPARATUS | STATION SELECTION | X2, Y2 TO Xb, Yb |
| AIR CONDITIONER | TEMPERATURE REGULATION | X3, Y3 TO Xc, Yc |
| AIR CONDITIONER | AIR VOLUME CONTROL | X4, Y4 TO Xd, Yd |

| OPERATION TARGET APPARATUS | FUNCTION | POSITION COORDINATE RANGE |
|---|---|---|
| IN-VEHICLE APPARATUS | SOUND VOLUME CONTROL | X1, Y1, Z1 TO Xa, Ya, Za |
| IN-VEHICLE APPARATUS | STATION SELECTION | X2, Y2, Z2 TO Xb, Yb, Zb |
| AIR CONDITIONER | TEMPERATURE REGULATION | X3, Y3, Z3 TO Xc, Yc, Zc |
| AIR CONDITIONER | AIR VOLUME CONTROL | X4, Y4, Z4 TO Xd, Yd, Zd |

GESTURE RECOGNITION APPARATUS, GESTURE RECOGNITION METHOD, AND RECORDING MEDIUM

PRIORITY CLAIM

This application claims the benefit of Japanese Patent Application No. 2012-265377, filed on Dec. 4, 2012, which is incorporated by reference herein in its entirety.

BACKGROUND

1. Field of the Invention

The present invention relates to a gesture recognition method and apparatus, and particularly relates to a gesture recognition method and apparatus for recognizing gestures of an operating body.

2. Description of the Related Art

Recently, various devices, such as household electrical appliances, personal computers, or game consoles, which may recognize gestures of a user and perform command entry corresponding to the recognition result, have become widespread.

In this kind of apparatus, the more commands there are that may be entered by gestures of a user with a hand, the more a user must memorize specific hand motions. Therefore, only simple hand motions in an upward, downward, right, or left direction or the like have been predominantly used.

With only a limited number of hand motions; however, operation of a plurality of operation target apparatuses is limited. Therefore, various techniques have been proposed in which a hand motion is combined with a sound, a line of sight, or an orientation of a face (see, for example, Japanese Unexamined Patent Application Publication No. 2000-163196, Japanese Unexamined Patent Application Publication No. 2007-121576, and Japanese Patent Registration No. 4311190).

When an element other than gestures with a hand, such as a sound, a line of sight, or an orientation of a face, is to be a target of recognition; however, a user is forced to make complex motions, and moreover a plurality of different kinds of recognition processing need to be performed, which is disadvantageous with respect to operability, cost, and response time.

SUMMARY

Accordingly, certain embodiments of the present invention has been designed in view of the issue described above and there is provided a gesture recognition apparatus, a gesture recognition method, and a recording medium with which operability, economic efficiency, and promptness may be improved.

According to an aspect of the present invention, there is provided a gesture recognition apparatus for recognizing a gesture of a predetermined operating body, the gesture recognition apparatus including a storage unit, an image capturing unit, a coordinate detecting unit, an operation target apparatus specifying unit, and a gesture recognition processing unit. In the storage unit, correspondence relationships between a plurality of coordinate ranges in relation to the operating body and a plurality of operation target apparatuses are stored, each of the plurality of coordinate ranges corresponding to a corresponding one of the plurality of operation target apparatuses. The image capturing unit captures an image of the operating body. The coordinate detecting unit detects coordinates of the operating body, an image of which has been captured by the image capturing unit. The operation target apparatus specifying unit specifies an operation target apparatus corresponding to the coordinates of the operating body on the basis of the coordinates of the operating body detected by the coordinate detecting unit and the correspondence relationships stored in the storage unit. The gesture recognition processing unit performs operation processing for the operation target apparatus specified by the operation target apparatus specifying unit, the operation processing corresponding to a result of recognition of the gesture of the operating body, an image of which has been captured.

According to another aspect of the present invention, there is provided a gesture recognition method for recognizing a gesture of a predetermined operating body, the gesture recognition method including a first step, a second step, a third step, a fourth step, and a fifth step. In the first step, correspondence relationships between a plurality of coordinate ranges in relation to the operating body and a plurality of operation target apparatuses are set in a storage unit, each of the plurality of coordinate ranges corresponding to a corresponding one of the plurality of operation target apparatuses. In the second step, an image of the operating body is captured. In the third step, coordinates of the operating body, an image of which has been captured in the second step, are detected. In the fourth step, an operation target apparatus corresponding to the detected coordinates of the operating body is specified on the basis of the coordinates of the operating body detected in the third step and the correspondence relationships set in the first step. In the fifth step, operation processing is performed for the operation target apparatus specified in the fourth step, the operation processing corresponding to a result of recognition of the gesture of the operating body, an image of which has been captured.

According to another aspect of the present invention, there is provided a recording medium in which a gesture recognition program for recognizing a gesture of a predetermined operating body is recorded, the program causing a computer to function as a coordinate detecting unit, an operation target apparatus specifying unit, and an operation processing unit. The coordinate detecting unit detects coordinates of the operating body, an image of which has been captured by an image capturing unit. The operation target apparatus specifying unit specifies an operation target apparatus corresponding to the coordinates of the operating body on the basis of the coordinates of the operating body detected by the coordinate detecting unit, and correspondence relationships between a plurality of coordinate ranges in relation to the operating body and a plurality of operation target apparatuses, each of the plurality of coordinate ranges corresponding to a corresponding one of the plurality of operation target apparatuses, the correspondence relationships being stored in a storage unit. The operation processing unit performs operation processing for the operation target apparatus specified by the operation target apparatus specifying unit, the operation processing corresponding to a result of recognition of the gesture of the operating body, an image of which has been captured.

According to the aspects of the present invention described above, selection of an operation target apparatus in accordance with the position of an operating body is possible and therefore a plurality of operation target apparatuses may be selectively operated promptly and easily with a simple technique.

In the above-described gesture recognition apparatus, in the storage unit, a correspondence relationship may be stored for each of a plurality of operation target functional units of each of the operation target apparatuses, the operation target apparatus specifying unit may specify an operation target functional unit concurrently with the specification of an operation target apparatus, and the gesture recognition processing unit may perform the operation processing for the operation target functional unit specified by the operation target apparatus specifying unit. Similarly, in the above-described gesture recognition method, the first step may be a step in which a correspondence relationship is set for each of a plurality of operation target functional units of each of the operation target apparatuses, the fourth step may be a step in which an operation target functional unit is specified concurrently with the specification of an operation target apparatus, and the fifth step may be a step in which the operation processing is performed for the operation target functional unit specified in the fourth step. Similarly, the program recorded in the above-described recording medium may cause the computer to function as the storage unit, in which a correspondence relationship is stored for each of a plurality of operation target functional units of each of the operation target apparatuses, the operation target apparatus specifying unit, which specifies an operation target functional unit concurrently with the specification of an operation target apparatus, and the operation processing unit, which performs the operation processing for the operation target functional unit specified by the operation target apparatus specifying unit.

With such a configuration, selection of an operation target functional unit in accordance with the position of an operating body is possible and therefore a plurality of operation target functional units may be selectively operated promptly and easily with a simple technique.

In the above-described gesture recognition apparatus, any of the coordinate ranges may be set to be a range relatively near an operation target apparatus corresponding to this coordinate range and relatively far from an operation target apparatus not corresponding to this coordinate range. Similarly, in the above-described gesture recognition method, the first step may be a step in which any of the coordinate ranges is set to be a range relatively near an operation target apparatus corresponding to this coordinate range and relatively far from an operation target apparatus not corresponding to this coordinate range.

With such a configuration, an operation target apparatus may be selected by positioning an operating body near the operation target apparatus and therefore the operation target apparatus may be operated more intuitively.

In the above-described gesture recognition apparatus, any of the coordinate ranges may be set to be a range relatively near an operation target functional unit corresponding to this coordinate range and relatively far from an operation target functional unit not corresponding to this coordinate range. Similarly, in the above-described gesture recognition method, the first step may be a step in which any of the coordinate ranges is set to be a range relatively near an operation target functional unit corresponding to this coordinate range and relatively far from an operation target functional unit not corresponding to this coordinate range.

With such a configuration, an operation target functional unit may be selected by positioning an operating body near the operation target functional unit and therefore the operation target functional unit may be operated more intuitively.

In the above-described gesture recognition apparatus, the coordinate range may be a multi-dimensional coordinate range. Similarly, in the above-described gesture recognition method, the first step may be a step in which a multi-dimensional coordinate range is set.

With such a configuration, a two- or higher-dimensional coordinate range may be specified as a coordinate range corresponding to an operation target apparatus or an operation target functional unit, which makes it possible to flexibly support a layout including a plurality of operation target apparatuses and functional units.

In the above-described gesture recognition apparatus, the operating body may be a hand of a user.

With such a configuration, selective operation of a plurality of operation target apparatuses may be performed with a hand promptly and easily at low cost.

The above-described gesture recognition apparatus may be mounted in a vehicle.

With such a configuration, operation of a plurality of in-vehicle apparatuses may be performed promptly and easily at low cost.

In the above-described gesture recognition apparatus, the operation target apparatuses may include an in-vehicle apparatus and an air conditioner.

With such a configuration, selective operation of an in-vehicle apparatus and an air conditioner may be performed promptly and easily at low cost.

In the above-described gesture recognition apparatus, the operation target functional units may include a sound volume control unit and a station selection unit of an in-vehicle apparatus and a temperature regulation unit and an air volume control unit of an air conditioner.

With such a configuration, a sound volume control unit and a station selection unit of an in-vehicle apparatus and a temperature regulation unit and an air volume control unit of an air conditioner may be selectively operated promptly and easily at low cost.

In the above-described gesture recognition apparatus, the operation target apparatuses may include a meter panel and a head-up display.

With such a configuration, a meter panel and a head-up display may be selectively operated promptly and easily at low cost.

The above-described gesture recognition apparatus may further include a notification device that notifies a user that the specification by the operation target apparatus specifying unit has been performed.

With such a configuration, a user may perform a desired gesture after confirming that a desired operation target apparatus/functional unit has been specified and therefore operation may be performed more effectively.

According to the aspects of the present invention, operability, economic efficiency, and promptness may be improved.

DETAILED DESCRIPTION

First Embodiment
Gesture Recognition Apparatus

A gesture recognition apparatus according to a first embodiment of the present invention is described below with reference to FIGS. 1 and 2.

Figure 1:
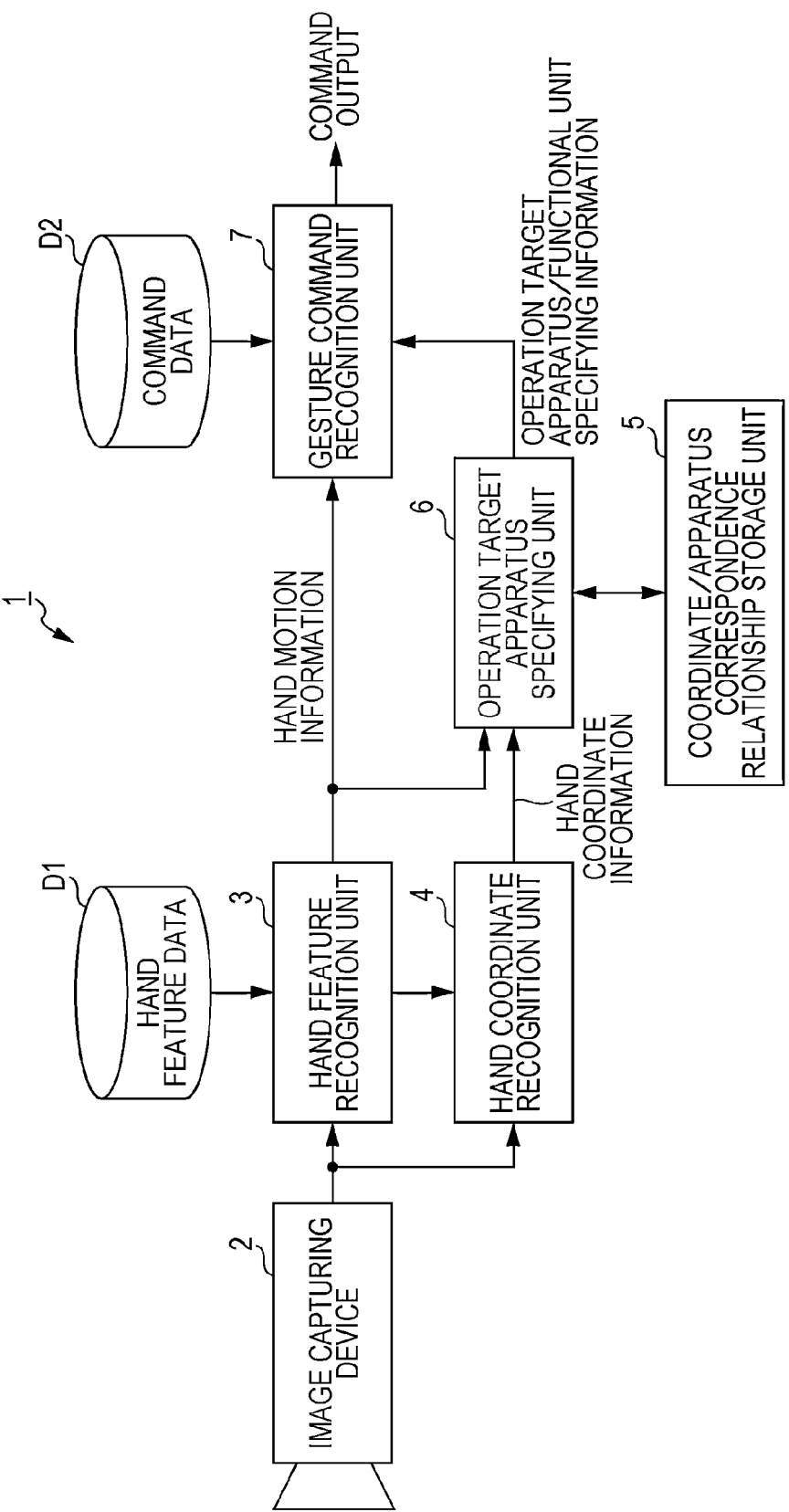
FIG. 1 is a block diagram of a gesture recognition apparatus according to a first embodiment of the present invention.

FIG. 1 is a block diagram illustrating a gesture recognition apparatus 1 in this embodiment.

As illustrated in FIG. 1, the gesture recognition apparatus 1 has an image capturing device 2 mounted in a vehicle, and the image capturing device 2 is able to capture an image of a hand of a driver (a user) as an operating body. The image capturing device 2 may be a digital camera that includes a solid state image sensor such as a charge-coupled device (CCD) or a complementary metal oxide semiconductor (CMOS), and may consecutively capture images of a predetermined image capturing region at a predetermined frame rate. The image capturing device 2 may be installed on an instrument panel or the like of a vehicle so as to face a vehicle interior.

As illustrated in FIG. 1, the gesture recognition apparatus 1 further has a hand feature recognition unit 3, and the hand feature recognition unit 3 is configured to receive each time an image is captured the image captured by the image capturing device 2. The hand feature recognition unit 3 is configured to then perform recognition processing on a hand feature in the received captured image on the basis of hand feature data D1 (shape, features, relative size between parts that make up the body portion, and the like) retained in advance in the hand feature recognition unit 3. Processing may be performed by a microprocessor, microprocessor, CPU, computer, processor and the like, which may include memory, program code, and input/output This recognition processing may be performed for each captured image or a captured image group of a series of a plurality of frames. The hand feature recognition unit 3 is configured to then output the recognized hand feature as hand motion information upon recognition of a gesture. The hand feature recognition unit 3 may be realized by causing the processor such as the central processing unit (CPU) to execute a program for implementing the function thereof. The program to be executed by the processor may be stored in a program storage unit such as a read-only memory (ROM), the hand feature data D1 may be stored in a data storage unit such as a ROM or a hard disk drive, and a work area such as a random access memory (RAM) may be used for processing by the processor.

As illustrated in FIG. 1, the gesture recognition apparatus 1 further has a hand coordinate recognition unit 4 as a coordinate detecting device, and the hand coordinate recognition unit 4 is configured to receive each time an image is captured the image captured by the image capturing device 2. The hand coordinate recognition unit 4 is configured to then perform recognition (detection) processing on hand coordinates in the received captured image on the basis of the result of recognition by the hand feature recognition unit 3. This recognition processing may be performed for each captured image or a captured image group of a series of a plurality of frames. The coordinates recognized here may be hand center coordinates. The hand coordinate recognition unit 4 is configured to then output each time recognition is made the recognition result as hand coordinate information. In this embodiment, the hand coordinate recognition unit 4 is configured to recognize two-dimensional coordinates (the X-coordinate and the Y-coordinate) as hand coordinates. The hand coordinate recognition unit 4 may be realized by causing a processor to execute a program for implementing the function thereof.

As illustrated in FIG. 1, the gesture recognition apparatus 1 further has a coordinate/apparatus correspondence relationship storage unit 5 as a storage device. In the coordinate/apparatus correspondence relationship storage unit 5, correspondence relationships between a plurality of coordinate ranges of a hand and a plurality of operation target apparatuses are stored, each of the plurality of coordinate ranges corresponding to a corresponding one of the plurality of operation target apparatuses. FIG. 2 is a table illustrating an example of such correspondence relationships. In this table, correspondence relationships between two-dimensional coordinate ranges as coordinate ranges of a hand and operation target apparatuses are described. Note that, as illustrated in FIG. 2, a coordinate range is described for each of a plurality of operation target functional units of an operation target apparatus. More specifically, for an in-vehicle apparatus, a coordinate range corresponding to a sound volume control function and a coordinate range corresponding to station selection are separately set. For an air conditioner, a coordinate range corresponding to temperature regulation and a coordinate range corresponding to air volume control are separately set. The coordinate/apparatus correspondence relationship storage unit 5 may be realized by a ROM, a hard disk drive, or the like.

Referring to FIG. 1 again, the gesture recognition apparatus 1 further has an operation target apparatus specifying unit 6 as an operation target apparatus specifying device. The operation target apparatus specifying unit 6 is configured to receive the hand motion information outputted from the hand feature recognition unit 3 and the hand coordinate information outputted from the hand coordinate recognition unit 4. The operation target apparatus specifying unit 6 is configured to then specify an operation target apparatus corresponding to the hand coordinates on the basis of both pieces of received information and the correspondence relationships stored in the coordinate/apparatus correspondence relationship storage unit 5. When a correspondence relationship is set for each operation target functional unit as illustrated in FIG. 2, the operation target apparatus specifying unit 6 is configured to specify an operation target functional unit concurrently with the specification of an operation target apparatus. The operation target apparatus specifying unit 6 is configured to then output the specification result as operation target apparatus/functional unit specifying information. The operation target apparatus specifying unit 6 may be realized by causing a processor to execute a program for implementing the function thereof.

As illustrated in FIG. 1, the gesture recognition apparatus 1 further has a gesture command recognition unit 7 as a gesture recognition processing device. The gesture command recognition unit 7 is configured to receive the hand motion information outputted from the hand feature recognition unit 3 and the operation target apparatus/functional unit specifying information outputted from the operation target apparatus specifying unit 6. The gesture command recognition unit 7 is configured to then issue a command for operation processing corresponding to the gesture recognition result to the operation target apparatus specified by the operation target apparatus specifying unit 6. The command is issued on the basis of the received hand motion information and operation target apparatus/functional unit specifying information, and command data (motion pattern information and the like) D2 retained in advance in the gesture command recognition unit 7. When the operation target apparatus/functional unit specifying information includes a result of specification of an operation target functional unit, a command is issued for the operation target functional unit. Note that the gesture command recognition unit 7 may be realized by causing a processor to execute a program for implementing the function thereof. The command data D2 may be stored in a data storage unit such as a ROM or a hard disk drive.

Then, the command, which has been outputted from the gesture command recognition unit 7, is received by the specified operation target apparatus or operation target functional unit, in which processing corresponding to the received command is executed.

In the configuration described above, selection of an operation target apparatus and an operation target functional unit in accordance with the position of a hand is possible and therefore a plurality of operation target apparatuses/functional units may be selectively operated promptly and easily with a simple configuration.

Gesture Recognition Method and Program

Next, a gesture recognition method and a gesture recognition program according to the first embodiment of the present invention, to which the gesture recognition apparatus 1 described above is applied, are described below with reference to FIG. 3.

Figures 2, 3:
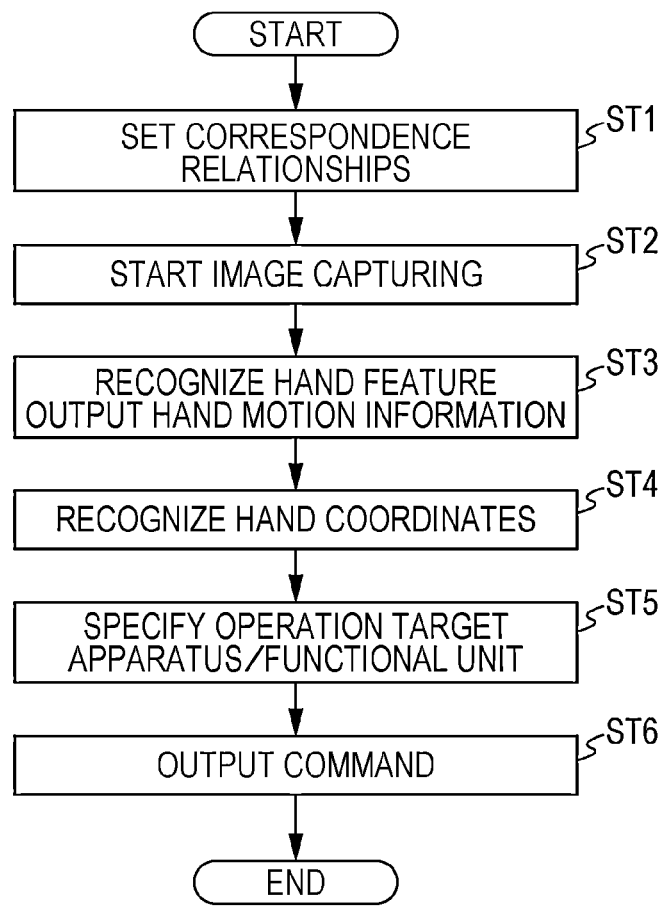
FIG. 2 is a table illustrating correspondence relationships between coordinate ranges of a hand, and operation target apparatuses and functional units.
FIG. 3 is a flowchart illustrating gesture recognition according to a specific embodiment of the present invention.

In this embodiment, in step 1 (ST1) of FIG. 3, correspondence relationships are first set (recorded) in the coordinate/apparatus correspondence relationship storage unit 5. This processing may be performed at the time of manufacturing of the gesture recognition apparatus 1.

Then, in step 2 (ST2), image capturing performed by the image capturing device 2 is started when an operation target apparatus is actually used. The image capturing may be started after occurrence of a predetermined trigger of performing a gesture.

Next, in step 3 (ST3), a hand feature is recognized by the hand feature recognition unit 3 on the basis of an image captured in step 2 (ST2), and a change in a recognition result is outputted as hand motion information.

Next, in step 4 (ST4), hand coordinates are recognized by the hand coordinate recognition unit 4, which is a function of a computer to be operated by the program of this embodiment, on the basis of the hand feature recognized in step 3 (ST3).

Next, in step 5 (ST5), an operation target apparatus/functional unit corresponding to the hand coordinates is specified by the operation target apparatus specifying unit 6, which is a function of a computer to be operated by the program of this embodiment, on the basis of the hand coordinates recognized in step 4 (ST4) and the correspondence relationships set in step 1 (ST1).

Next, in step 6 (ST6), a command is outputted to the specified operation target apparatus/functional unit by the gesture command recognition unit 7, which is a function of a computer to be operated by the program of this embodiment, on the basis of the operation target apparatus/functional unit specified in step 5 (ST5) and the hand motion information outputted in step 3 (ST3), and the processing is terminated.

Second Embodiment

Next, a second embodiment of the present invention is described below with reference to FIG. 4.

Note that like reference numerals and characters are used to describe components having a basic configuration identical or similar to that in the first embodiment.

The basic configuration of the gesture recognition apparatus 1 in this embodiment is identical to that in the first embodiment.

In this embodiment; however, as a form of the correspondence relationships set in the coordinate/apparatus correspondence relationship storage unit 5, a more specific and preferred form is selected.

Figures 4, 5:
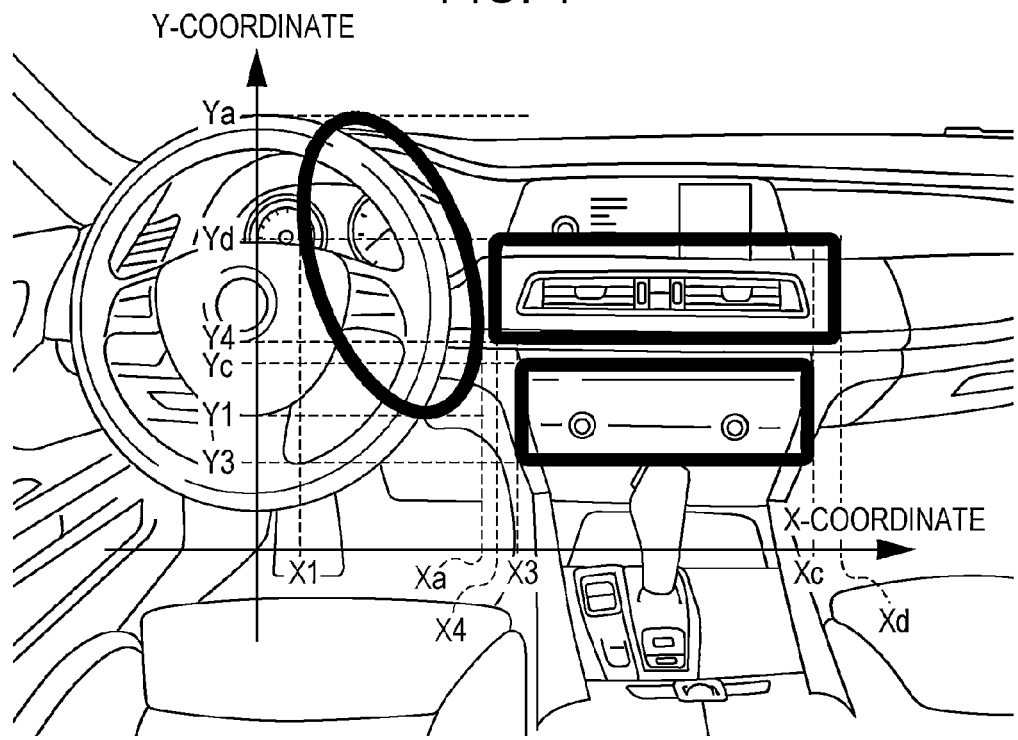
FIG. 4 is a pictorial diagram illustrating correspondence relationships between coordinate ranges of a hand, and operation target apparatuses and functional units according to a second embodiment of the present invention.
FIG. 5 is a table illustrating correspondence relationships between coordinate ranges of a hand, and operation target apparatuses and functional units according to a third embodiment of the present invention.

Specifically, as illustrated in FIG. 4, any coordinate range may be set in a range relatively near an operation target apparatus and an operation target functional unit corresponding to the coordinate range, and relatively far from an operation target apparatus and an operation target functional unit not corresponding to the coordinate range. More specifically, in FIG. 4, a coordinate range (X1, Y1 to Xa, Ya) corresponding to sound volume control of an in-vehicle apparatus is set in the vicinity of a steering switch for sound volume control. A coordinate range (X3, Y3 to Xc, Yc) corresponding to temperature regulation of the air conditioner is set in the vicinity of the operation panel of the air conditioner. A coordinate range (X4, Y4 to Xd, Yd) corresponding to air volume control of the air conditioner is set in the vicinity of an air outlet of the air conditioner.

In the configuration described above, an operation target apparatus/functional unit may be selected by positioning a hand near the operation target apparatus/functional unit and therefore the operation target apparatus/functional unit may be operated more intuitively. Taking FIG. 4 as an example, a gesture of an upward or downward motion with a hand in the vicinity of the steering wheel may increase or decrease the sound volume. A similar gesture in the vicinity of the operation panel of the air conditioner may raise or lower the temperature. A similar gesture in the vicinity of the air outlet of the air conditioner may increase or decrease the air volume.

Third Embodiment

Next, a third embodiment of the present invention is described below with reference to FIG. 5.

As illustrated in FIG. 5, in this embodiment, correspondence relationships between operation target apparatuses and operation target functional units, and three-dimensional coordinate ranges (X, Y, Z) are set in the coordinate/apparatus correspondence relationship storage unit 5. Here, the Z-coordinate represents the depth direction in FIG. 4, for example.

In such a configuration, only a gesture performed in the vicinity of an operation target apparatus/functional unit is recognized and therefore unintended operation by a user is effectively prevented from being recognized by mistake.

This embodiment may be combined with any one of the first and second embodiments.

Fourth Embodiment

Next, a fourth embodiment of the present invention is described below with reference to FIGS. 6 and 7.

Note that like reference numerals and characters are used to describe components having a basic configuration identical or similar to that in the first embodiment.

Figure 6:
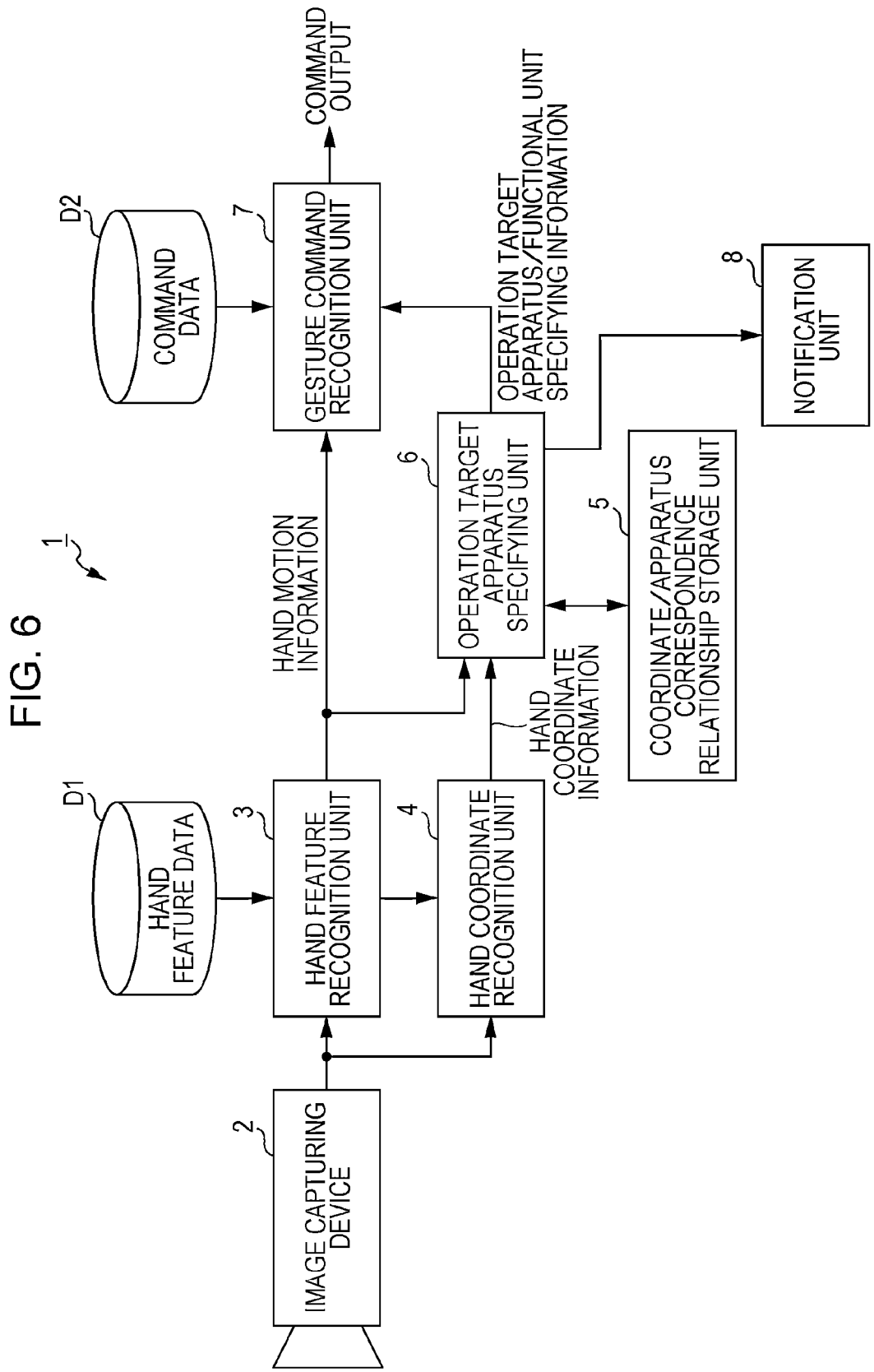
FIG. 6 is a block diagram of a gesture recognition apparatus according to a fourth embodiment of the present invention.

As illustrated in FIG. 6, the gesture recognition apparatus 1 in this embodiment further has a notification unit 8 as a notification device, in addition to the configuration of the first embodiment. The notification unit 8 is configured to notify a user that an operation target apparatus/functional unit has been specified by the operation target apparatus specifying unit 6. This notification may be made by at least one of audio output and display.

Figure 7:
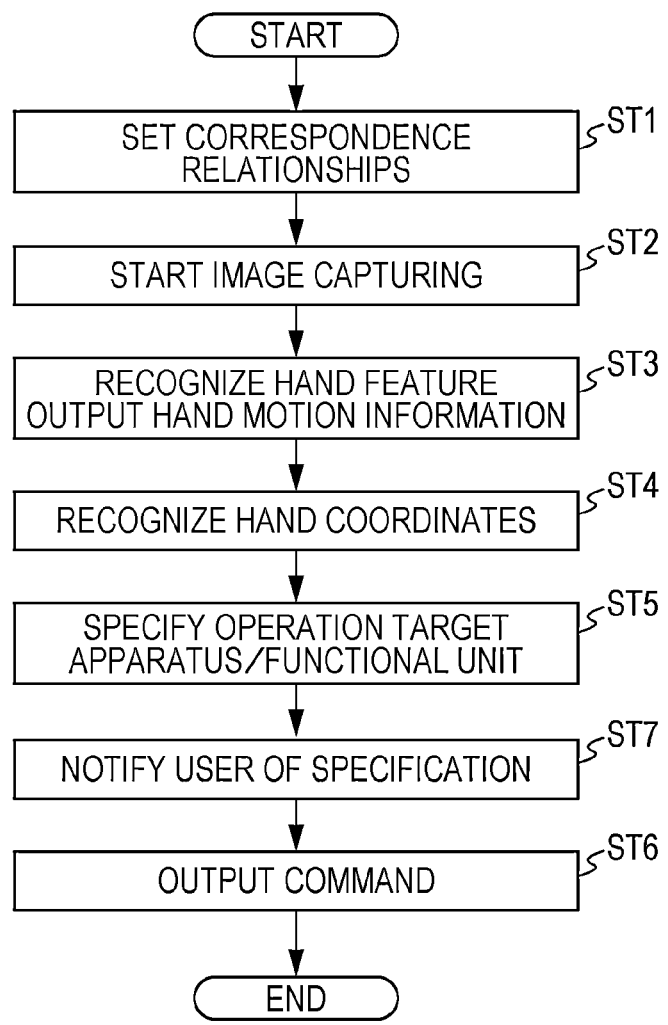
FIG. 7 is a flowchart illustrating gesture recognition according to the fourth embodiment of the present invention.

In a gesture recognition method and a gesture recognition program of this embodiment, as illustrated in FIG. 7, step 7 (ST7) is executed between step 5 (ST5) and step 6 (ST6) that are illustrated in FIG. 3.

More specifically, in step (ST7), a user is notified by the notification unit 8 that an operation target apparatus/functional unit has been specified.

According to this embodiment, a user may perform a desired gesture after confirming that a desired operation target apparatus/functional unit has been specified and therefore operation may be performed with more certainty.

It should be noted that the present invention is not limited to the embodiments described above and many variations and modifications may be made without departing from the spirit of the present invention.

For example, the present invention may be applied to operation of operation target apparatuses such as a head-up display or a meter panel.

Furthermore, the present invention may be applied to operation of a plurality of operation target apparatuses installed in a space other than a vehicle interior.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A gesture recognition apparatus for recognizing a gesture of a predetermined operating body, comprising:
    a storage unit, having stored therein, correspondence relationships between a plurality of coordinate ranges in relation to the operating body and to a plurality of operation target apparatuses, wherein each of the plurality of coordinate ranges corresponds to one operation target apparatus of the plurality of operation target apparatuses;
    an image capturing unit configured to capture one or more images of the operating body;
    a coordinate detecting unit configured to detect coordinates of the operating body based on the one or more captured images;
    an operation target apparatus specifying unit configured to select an operation target apparatus when the detected coordinates of the operating body come within the coordinate range associated with the operation target apparatus in the stored correspondence relationships between the plurality of coordinate ranges and the plurality of operation target apparatuses; and
    a gesture recognition processing unit configured to recognize a gesture associated with the operating body based on the one or more captured images and corresponding to the selected operation target apparatus.

2. The gesture recognition apparatus according to claim 1, wherein,
    in the storage unit, a correspondence relationship is stored for each of a plurality of operation target functional units of each operation target apparatus;
    the operation target apparatus specifying unit configured to specify an operation target functional unit concurrently with the specification of an operation target apparatus; and
    the gesture recognition processing unit configured to perform operation processing for the operation target functional unit specified by the operation target apparatus specifying unit.

3. The gesture recognition apparatus according to claim 2, wherein
    each of the coordinate ranges is set to be a range in proximity to an operation target functional unit corresponding to the respective coordinate range.

4. The gesture recognition apparatus according to claim 1, wherein
    each of the coordinate ranges is set to be a range in proximity to an operation target apparatus corresponding to the respective coordinate range.

5. The gesture recognition apparatus according to claim 4, wherein
    the coordinate range is a three-dimensional coordinate range.

6. The gesture recognition apparatus according to claim 5, wherein
    the operating body is a hand of a user.

7. The gesture recognition apparatus according to claim 6, the gesture recognition apparatus is mounted in a vehicle.

8. The gesture recognition apparatus according to claim 7, wherein
    the operation target apparatuses include an in-vehicle apparatus and an air conditioner.

9. The gesture recognition apparatus according to claim 7, wherein
    the operation target functional units include a sound volume control unit and a station selection unit of an in-vehicle apparatus, and a temperature regulation unit and an air volume control unit of an air conditioner.

10. The gesture recognition apparatus according to claim 7, wherein
    the operation target apparatuses include a meter panel and a head-up display.

11. The gesture recognition apparatus according to claim 1, further comprising:
    a notification device configured to notify a user that the selection by the operation target apparatus specifying unit has been performed.

12. A gesture recognition method for recognizing a gesture of a predetermined operating body, the method carried out by a processor performing steps comprising:
    a first step in which correspondence relationships between a plurality of coordinate ranges of the operating body and to a plurality of operation target apparatuses are stored in a storage unit, wherein each of the plurality of coordinate ranges corresponds to one operation target apparatus of the plurality of operation target apparatuses;
    a second step in which one or more images of the operating body is captured;
    a third step in which coordinates of the operating body are detected based on the one more captured images;
    a fourth step in which an operation target apparatus is selected when the detected coordinates of the operating body come within the coordinate range associated with the operation target apparatus in the stored correspondence relationships between the plurality of coordinate ranges and the plurality of operation target apparatuses; and
    a fifth step in which a gesture associated with the detected operating body is recognized based on the one or more captured images corresponding to the selected operation target apparatus.

13. The gesture recognition method according to claim 12, wherein
    a correspondence relationship is set for each of a plurality of operation target functional units of each operation target apparatus;
    an operation target functional unit is specified concurrently with the selection of an operation target apparatus; and
    operation processing is performed for the specified operation target functional unit.

14. The gesture recognition method according to claim 13, wherein
each of the coordinate ranges is set to be proximate to a corresponding operation target functional unit.

15. The gesture recognition method according to claim 12, wherein
each of the coordinate ranges is set to be proximate to a corresponding operation target apparatus.

16. The gesture recognition method according to claim 15, wherein
the coordinate ranges are set in a multi-dimensional coordinate space.

17. A non-transitory recording medium in which a gesture recognition program for recognizing a gesture of a predetermined operating body is recorded, the program causing a computer to function as:
a coordinate detecting unit configured to detect coordinates of the operating body based on one or more images captured by an image capturing unit;
an operation target apparatus specifying unit configured to select an operation target apparatus when the detected coordinates of the operating body come within the coordinate range associated with the operation target apparatus in correspondence relationships between a plurality of coordinate ranges of the operating body and a plurality of operation target apparatuses, wherein each of the plurality of coordinate ranges corresponds to one of the plurality of operation target apparatuses, the correspondence relationships being stored in a storage unit; and
an operation processing unit configured to recognize a gesture associated with the operating body based on the one or more captured images and corresponding to the selected operation target apparatus.

18. The recording medium in which a gesture recognition program is recorded according to claim 17, wherein, the program causing the computer to function as:
the storage unit, in which a correspondence relationship is stored for each of a plurality of operation target functional units of each of the operation target apparatuses,
the operation target apparatus specifying unit, which specifies an operation target functional unit concurrently with the specification of an operation target apparatus, and
the operation processing unit, which performs the operation processing for the operation target functional unit specified by the operation target apparatus specifying unit.

* * * * *